United States Patent [19]

Hakkanen et al.

[11] Patent Number: 5,663,954
[45] Date of Patent: Sep. 2, 1997

[54] FRAME TIMING CONTROL OF TIME DIVISION MULTIPLE ACCESS

[75] Inventors: Jouko Hakkanen, Salo; Arto Karppanen, Helsinki, both of Finland

[73] Assignee: Nokia Mobile Phones Ltd.

[21] Appl. No.: 549,650

[22] Filed: Oct. 27, 1995

[30] Foreign Application Priority Data

Oct. 31, 1994 [FI] Finland .................... 945109

[51] Int. Cl.6 ................ H04Q 7/30; H04Q 7/32
[52] U.S. Cl. ............ 370/278; 370/331; 370/509; 370/915
[58] Field of Search ............... 370/105.1, 95.3, 370/100.1, 278, 329, 345, 503, 509, 915, 331; 379/59, 60; 455/33.1, 33.2

[56] References Cited

U.S. PATENT DOCUMENTS

| | | | |
|---|---|---|---|
| 4,686,672 | 8/1987 | Namiki et al. | 370/95.3 |
| 4,722,093 | 1/1988 | Tejima et al. | 375/75 |
| 5,408,504 | 4/1995 | Ostman | 375/354 |
| 5,426,670 | 6/1995 | Leppanen et al. | 375/343 |
| 5,440,597 | 8/1995 | Chung et al. | 375/200 |

FOREIGN PATENT DOCUMENTS

| | | |
|---|---|---|
| 0 474 138 A2 | 3/1992 | European Pat. Off. ......... H04Q 7/04 |
| 0641097 A1 | 3/1995 | European Pat. Off. . |
| WO93/09623 | 5/1993 | WIPO . |
| WO93/25017 | 12/1993 | WIPO . |

OTHER PUBLICATIONS

Finnish Office Action and English Translation thereof, dated 8 Aug. 1995, Nokia Mobile Phones Ltd., Application No. 945109.

Sollenberger, N.R. et al., "Architecture and Implementation of an Efficient and Robust TDME Frame Structure for Digital Portable Communications" IEEE Transactions vol. 40, No. 1, part 2, pp. 250–260, Feb. 1991, USA (English Abstract).

*Primary Examiner*—Benedict V. Safourek
*Assistant Examiner*—Matthew C. Phillips
*Attorney, Agent, or Firm*—Perman & Green, LLP

[57] ABSTRACT

The frame timing control of TDMA signals in cellular systems is implemented in mobile stations and/or base stations according to the invention so that the functions are divided between the frame timing control unit (1) and the microcontroller (2). In this way, the frame timing can be controlled in a flexible manner, for instance when moving from one TDMA cell type to another, without breaking the speech or data communication.

18 Claims, 5 Drawing Sheets

FRAME TIMING CONTROL OF TIME DIVISION MULTIPLE ACCESS

FIELD OF THE INVENTION

The object of the invention is a method for the frame timing control of TDMA signals and a circuit arrangement for implementing the frame timing.

BACKGROUND OF THE INVENTION

Digital cellular telephone systems use, for instance, data transmission based on time division multiple access in the communication between a base station and a mobile station. The time division GSM system uses 8 time slots, which makes it possible for 8 mobile stations to communicate simultaneously with the base station on the same transmit/receive frequency. Each mobile station reserves one time slot from the frame and the speech or data signal to be transmitted is packed in this time slot in a coded form. The frame timing of mobile phones in the GSM system is not very time-critical to be controlled by a signal processor because of a fairly extensive length of the time slot (577 µs) and a low bit rate (270 kbit/s). Furthermore, simultaneous transmission and reception is not required of GSM mobile stations.

As systems based on the TDMA develop, the requirements for mobile phone timing increase because higher data transmission capacity is required, and as a consequence, traffic in different types of cells is required. Cell types differ from each other with respect to bit rates and burst lengths. The burst length of a macro cell is higher and the bit rate lower than those of a micro or pico cell. In this case the requirement for a fast handover from one cell type to another without a break in the data transmission becomes essential.

Especially when transferring data at high bit rate, the mobile phone has to receive a short burst with a high bit rate, while simultaneously transmitting a longer burst with a lower bit rate.

Instead, the clock frequency in a micro cell of the TDMA system is higher, and especially when the mobile station moves between different cell types, such as macro cells and micro/pico cells, higher bit rate and accuracy in the frame timing is required.

SUMMARY OF THE INVENTION

The purpose of the present invention is to provide a frame timing control for TDMA signals which overcomes the problems described above. In order to achieve this, the method of the invention is characterized, according to claim 1, in that the frame timing control is divided between a frame timing control unit implemented by a fast frame timing logic of the transmitter/receiver, on the one hand, and the microcontroller of the transmitter/receiver part, on the other hand. In this case no excessively high processing capacity is required of the microcontroller or the DSP, while the structure of the circuits needed for the frame control still remains relatively simple.

The microcontroller now defines the length of each TDMA frame and the respective start and stop values of each burst. The frame timing block of the frame timing unit specifies the length of the TDMA frame and the timing data is transmitted to the receiver branch and the transmit branch of the burst building blocks. Data indicating the frame length is recorded in the frame timing block register, whereafter the counter is stepped in synchronization with the system clock until the length value of the frame is reached. An interrupt signal is transmitted therefrom to the microcontroller and the counter is reset. This function is repeated continuously. The synchronization input connected to the counter can be activated if needed so that the counter is reset in the middle of a count cycle, for instance, when the counter has to be synchronized to another counter, i.e., when synchronizing between two base stations.

The method according to the invention provides a flexible application of a TDMA-based system in which, according to the respective TDMA-based system requirements, the microcontroller can be used to change the frame length, the length of receive or transmit bursts within the same frame, and the sampling rate of the burst building of reception or transmission.

The circuit arrangement can easily be implemented using CMOS technology by an FPGA unit (Field Programmable Gate Array) so that the frame timing unit comprises a 16 bit counter, three 16 bit comparators, compare registers and their buffer registers, an 8 bit frame counter, and transmit/receive timing control circuits. The frame timing control unit also controls that filters, the reception amplification, the transmit power level, and the power ramp are correctly selected in real time, and it further provides real-time interrupt pulses to the microcontroller.

The TDMA frame timing control according to the invention can be applied in cellular network mobile stations (MS) and/or base stations (BS). The following characteristics which can be achieved by the invention are worth mentioning:

frame length can be set to any value;
receive burst length, burst start value and burst stop value can be freely selected and the sampling rate can be changed between bursts;
transmit burst length, burst start value and burst stop value can be freely selected (facilitating the forming of time advance in particular), sampling rate can be changed between bursts and, in addition, different power ramp forms can be selected and controlled. The transmit power can be controlled and the power ramp forming can also be changed between transmit bursts;
handover from one TDMA cell type to another can be carried out quickly without breaking speech or data communication;
the invention can also be applied in mobile stations operating in many different TDMA-based systems, such as the so-called Dual Mode or Multiple Mode devices.

BRIEF DESCRIPTION OF THE DRAWINGS

The invention ms described in the following in more detail with reference to the appended drawings in which.

DETAILED DESCRIPTION OF THE INVENTION

Figure 1:
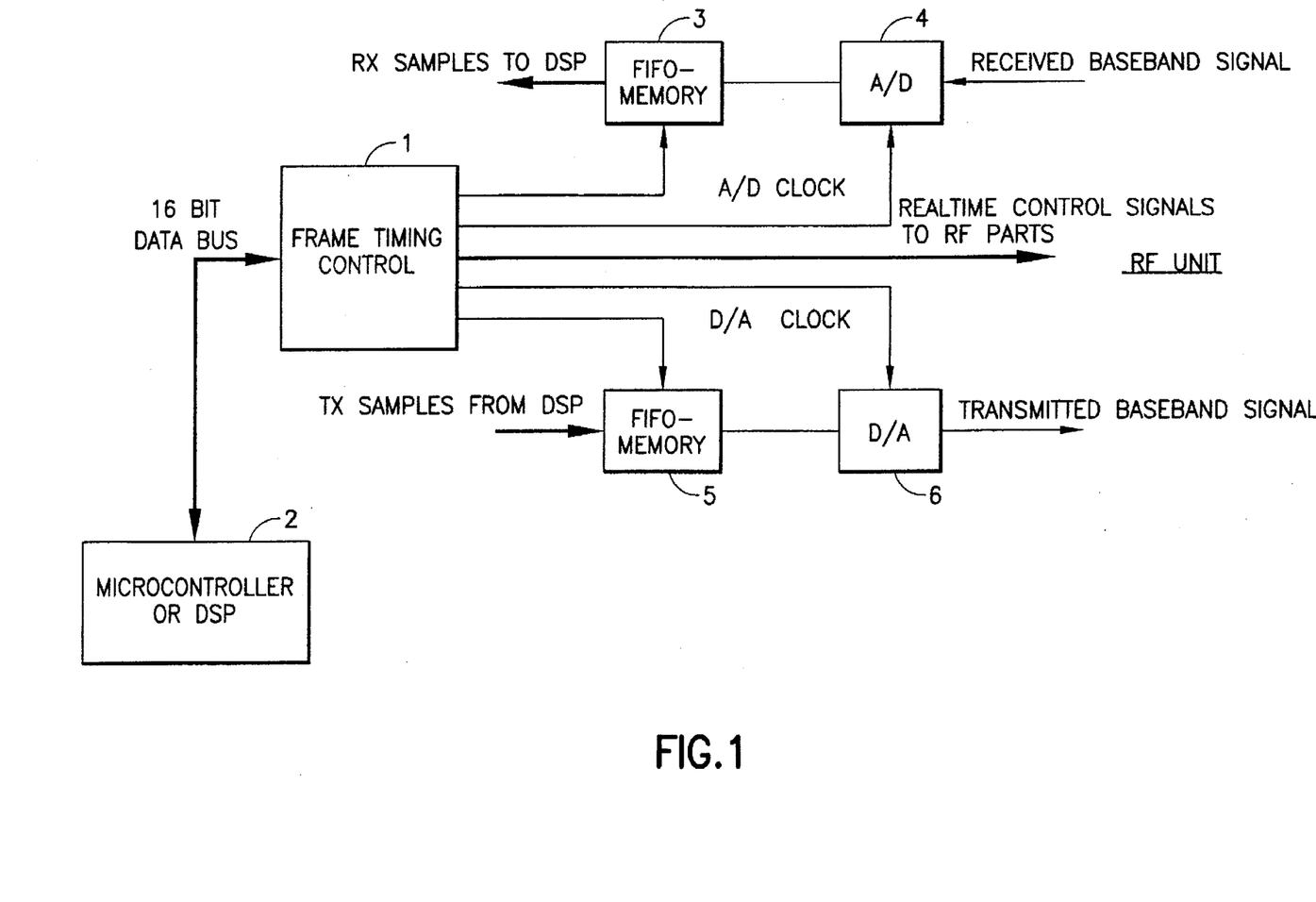
FIG. 1 presents a circuit arrangement according to the invention in the form of a block diagram wherein the frame timing control of TDMA signals is divided between a microcontroller and a frame control unit.

The method and system according to the invention are described in FIGS. 1 to 5, using as an example the transmitter/receiver part of a mobile station. Referring to FIG. 1, a baseband signal received in the receiving branch of the radio part (RF unit) is first transmitted to analog/digital converter 4 and from there to FIFO memory 3, from where the received I/Q samples (In-phase/Quadrature, i.e., samples which are in phase and those in a 90 degree phase shift relative to them, well-known by those skilled in the art) are read into a digital signal processor (not shown). In a corresponding manner, the I/Q samples to be transmitted which come from the digital signal processor are first sent to FIFO memory 5 and from there as a baseband signal which is transmitted via digital/analog converter 6.

FIG. 1 shows the block diagram of the arrangement according to the invention for the frame timing control of TDMA signals.

The control is divided between frame timing control unit 1 and 16 bit microcontroller 2, data transmission between them being carried out by a 16 bit data bus. The microcontroller can be replaced by digital signal processor 2 if desired.

Frame timing control unit 1 according to the invention controls the sampling of circuits 4, 6 using clock signals "A/D clock" and, correspondingly, "D/A clock" so that the sampling rate can be selected in real time. Control logic 1 also monitors that filters, reception amplification, transmit power level and power ramp, which are not described herein in detail but which are well-known to those skilled in the art, are correctly selected. Control logic 1 provides realtime interrupt pulses to microcontroller 2.

The main basis for the circuit design of the arrangement according to the invention is a general functional flexibility. This is accomplished by dividing the operation in two parts. The microcontroller may be a relatively simple 16 bit microcontroller, and no DSP performance is needed here, even though sequential time slots of about 70 microseconds each are processed. Frame synchronization control unit 1 can be implemented by a fast logic. One of the basic objects of the invention is that the frame building must be compatible with different TDMA-based systems. When building a frame in the present solution, the frame length can be of any desired length and the length can easily be changed without interrupting the operation. Any desired burst length can be used in the receive burst building. The burst start and stop values can also be freely chosen. The sampling rate can be changed between different bursts. In the transmit burst building, the burst length and the burst start and stop values can also be freely chosen. Correspondingly, the sampling rate can be changed between different bursts. In transmission, different transmit power levels and power ramps can also be chosen.

Figure 2:
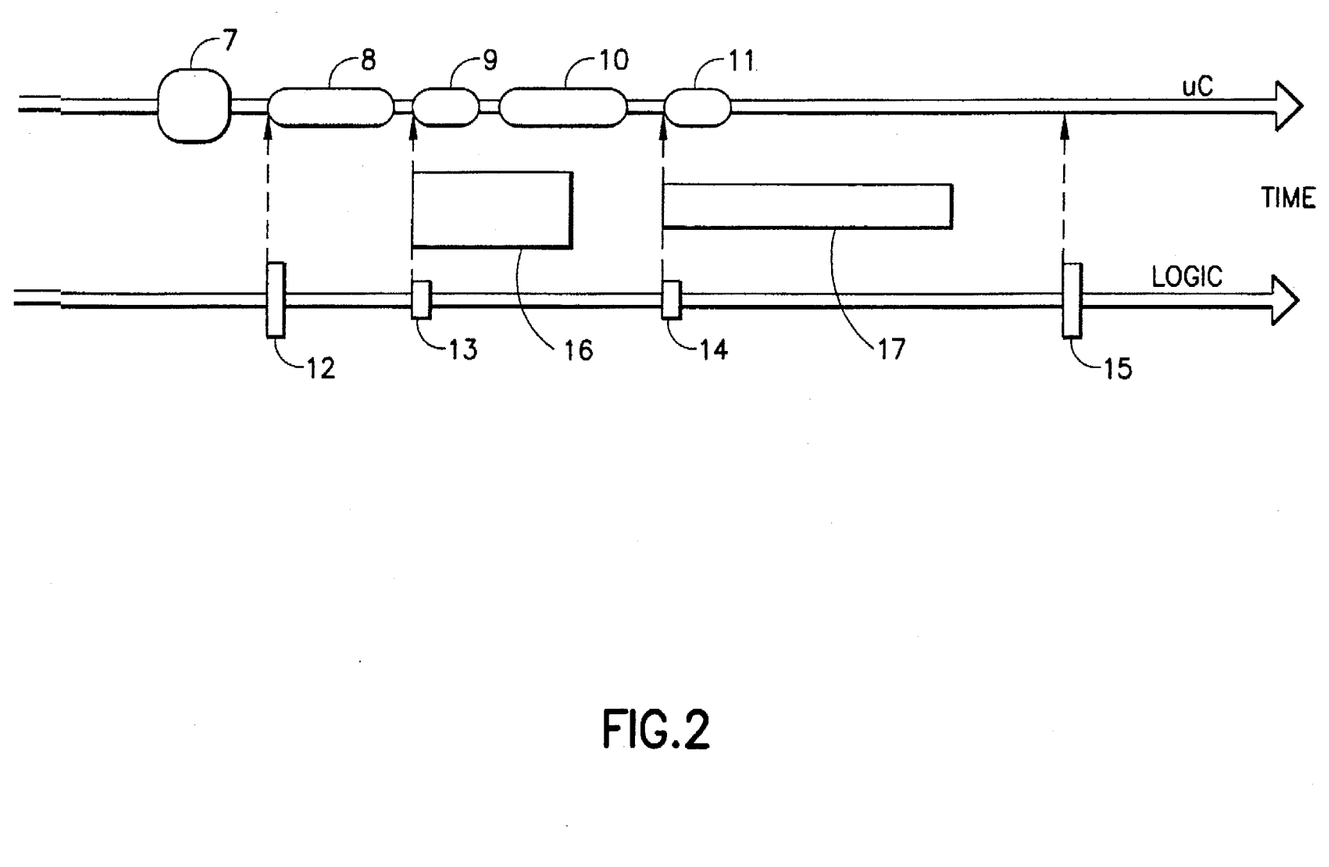
FIG. 2 presents on a time axis the share of work of the microcontroller and the frame timing unit implemented in the arrangement in FIG. 1.

FIG. 2 shows how two sequential bursts 16, 17 are built during one frame cycle, i.e., the time between points 12 and 15. The frame cycle start values are marked numbers 12, 15 and correspondingly, the start values of bursts 16, 17 are marked numbers 13, 14. The frame length definition is marked number 7, the burst start definition is marked numbers 8 and 10, and the burst stop definition is marked numbers 9 and 11. The sampling rates and lengths of bursts 16 and 17 herein deviate from each other.

Figure 3:
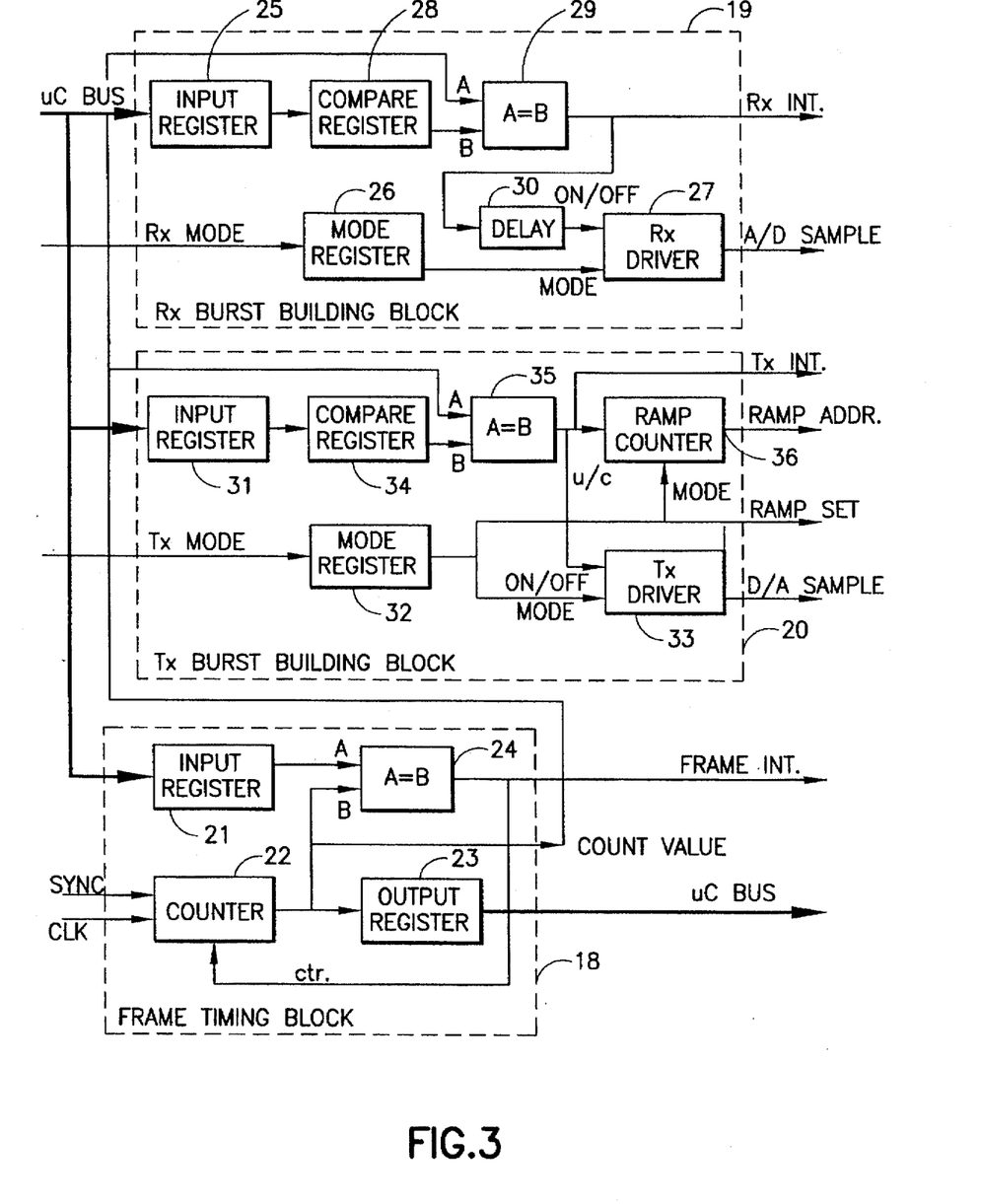
FIG. 3 presents the structure of the frame timing unit in FIG. 1, the building blocks of both the transmit and receive bursts of the unit being illustrated in more detail.

The frame timing control of the method of the invention is divided, as already mentioned, between control unit 1 and microcontroller 2. FIG. 2 shows schematically on a time axis the share of work between microcontroller 2 and frame timing unit 1 implemented in the arrangement in FIG. 1. The tasks of microcontroller 2 (μC) are presented in the top line and the tasks of logic circuit 1 in the bottom time axis. The method can be divided into phases in which:

A) length 7, start value 8, 10 of each burst, and stop value 9, 11 of each burst of the TDMA frame according to each respective need is defined in microcontroller 2 as a continuous operation, whereby also the length of the bursts is defined;

B) length 12, 15 of the TDMA frame whose turn it is is formed in frame timing block 18 of frame timing unit 1 (FIG. 3). Microcontroller 2 is informed of the start value of the new frame as frame synchronization, using the interrupt line; this is illustrated by the arrows (12 and 15) at the beginning of the frames. The timing data for burst building blocks 19, 20 of the receive branch and transmit branch is also formed within frame timing unit 1 (FIG. 3).

TDMA frame timing control unit 1 according to the invention is divided in three blocks: frame timing block 18, receive burst building block 19 and transmit burst building block 20.

FIG. 3 presents the structure of the frame timing unit in FIG. 1, the transmit and receive burst building blocks of which are presented in more detail.

The main task of the transmit and receive burst building blocks 20, 19 is to clock the A/D and D/A sampling during a given burst cycle. These blocks 20, 19 also provide interrupt data of the burst start value (13, 14) to microcontroller 2 for synchronization. Transmit burst building block 20 also generates the power ramp control (ramp addr, ramp set) which goes to the transmitter and is not shown herein in detail.

Frame timing block 18, which is shown here as a block diagram, comprises counter 22, input register 21 and output register 23, and comparator 24. After microcontroller 2 has loaded the frame length value to input register 21 using data bus "μC bus", counter 22 counts the length of the frame signal and provides interrupt "frame int" to microcontroller 2 once during the frame cycle. Counter 22 can be reset by external synchronization signal "sync" if needed.

The counting of the frame length starts when the processor writes the length value of a 16 bit frame in input register 21. Counter 22 counts the cycles of the system clock until comparator 24 detects that counter 22 has reached the value of input register 21 and resets counter 22 by feedback signal "clr". The counting and measuring of the frame length is repeated as a continuous operation.

The frame length can be changed by writing a new value in input register 21. When resynchronization must be carried out between two devices, signal "sync" can be fed to the input of counter 22, whereby the counter is immediately reset in the middle of the counting cycle. Output register 23 comprises the value of the length count in progress of each respective frame. By reading this register, the processor can check the timing at that moment in time very accurately. The 16 bit count value of the frame signal, formed by the counter, is also transmitted as signal "count value" to transmit and receive burst building blocks 20, 19.

Receive burst building block 19 comprises input register 25, into which the burst data from the data bus is written. Transmit mode data "Rx mode" is transmitted to receive mode register 26, the desired sampling rate being defined by the Rx mode. The block further comprises receive driver 27, compare register 27, comparator 29, and delay component 30. Microcontroller 2 defines the respective burst length by defining the actual start and stop values. A reference time is received from counter 22 and is compared in comparator 29 with given start and stop values. In this way, receive burst building block 19 is able to form bursts of desired lengths. Receive burst building block 19 controls the sampling rate by using clock signal "A/D sample" of the output of driver 27 and it can change the rate between received bursts.

The processor first writes the burst start time in input register 25. This value is further transferred to compare register 28. The controller can also be used to provide the desired sampling rate to mode register 26. When the time reference "count value" received from counter 22 corresponds to the start time in the register, comparator 29 provides interrupt "Rx int" to processor 2 and the reception is started.

When processor 2 receives an interrupt signal, it writes the stop value for the received burst in input register 25. This value is further transferred to compare register 28. Thereafter, the processor can provide a new burst start value to input register 25 again. Using this queuing mechanism, the frame timing control unit is able to receive sequential bursts and the timing accuracy required for the control operation is reasonable, i.e., the circuits can be implemented by relatively slow components. The reception of I/Q samples is started after short delay 30 which compensates the conversion time of the A/D converter. The reception is continued until the "count value" corresponds to the burst stop value.

Similarly, transmit burst building block 20 in FIG. 3 comprises input register 31, mode register 32, transmit driver 33, compare register 34, comparator 35 and ramp counter 36. Microcontroller 2 specifies the burst length by defining the actual start and stop values. Counter 22 can be used to provide a reference time which is compared with given start and stop values. In this way, the transmit burst building block 20 can form bursts of desired lengths. Transmit burst building block 20 can also change the sampling rate between transmitted bursts.

The processor first writes the burst start value in input register 31. This value is further transferred to compare register 34. Controller 2 can also be used to provide a desired sampling rate or transmit mode "Tx mode" to mode register 32. When the time reference "count value" obtained from counter 22 corresponds to the burst start value, comparator 35 provides interrupt "Tx int" to processor 2 and the transmission is started. Upon receiving the interrupt signal, processor 3 writes the stop value of the transmitted burst in input register 31. This value is further transferred to compare register 34. Thereafter, processor 2 can provide a new burst start value to input register 31 again. With the aid of this solution, controller 1 can transmit sequential bursts and the operation mainly corresponds to the one described above relating to the receive branch. Consequently, the transmit burst lengths can vary between bursts and the sampling rate can also vary from burst to burst. The I/Q samples are taken to D/A converter 6 during the transmission.

Ramp counter 36 operates in connection with transmit driver 33. The power level "ramp addr" and the ramp form "ramp sel" of the transmitter (not shown) are controlled using these two blocks 33, 36. At the start of the burst, the transmitter power level is at zero in a known manner and the desired power level is reached at the end of the ramp up. Transmission of the burst is continued on this power level. When the output "count value" of counter 22 corresponds to the burst stop value, the power down sequence takes over and the transmit power is switched off. The form of the power ramp has been stored as samples in a ramp memory (not shown) from where it is searched, controlled by the "ramp addr" bus, to the D/A converter (not shown) which controls the power level. During the ramp, counter 36 steps up, and correspondingly, the ramp memory produces a control sequence which continuously changes and increases the power. At the end of the burst, the power level control is similar, but now downwards. Using this arrangement different ramp forms can be selected for sequential bursts.

Figure 4:
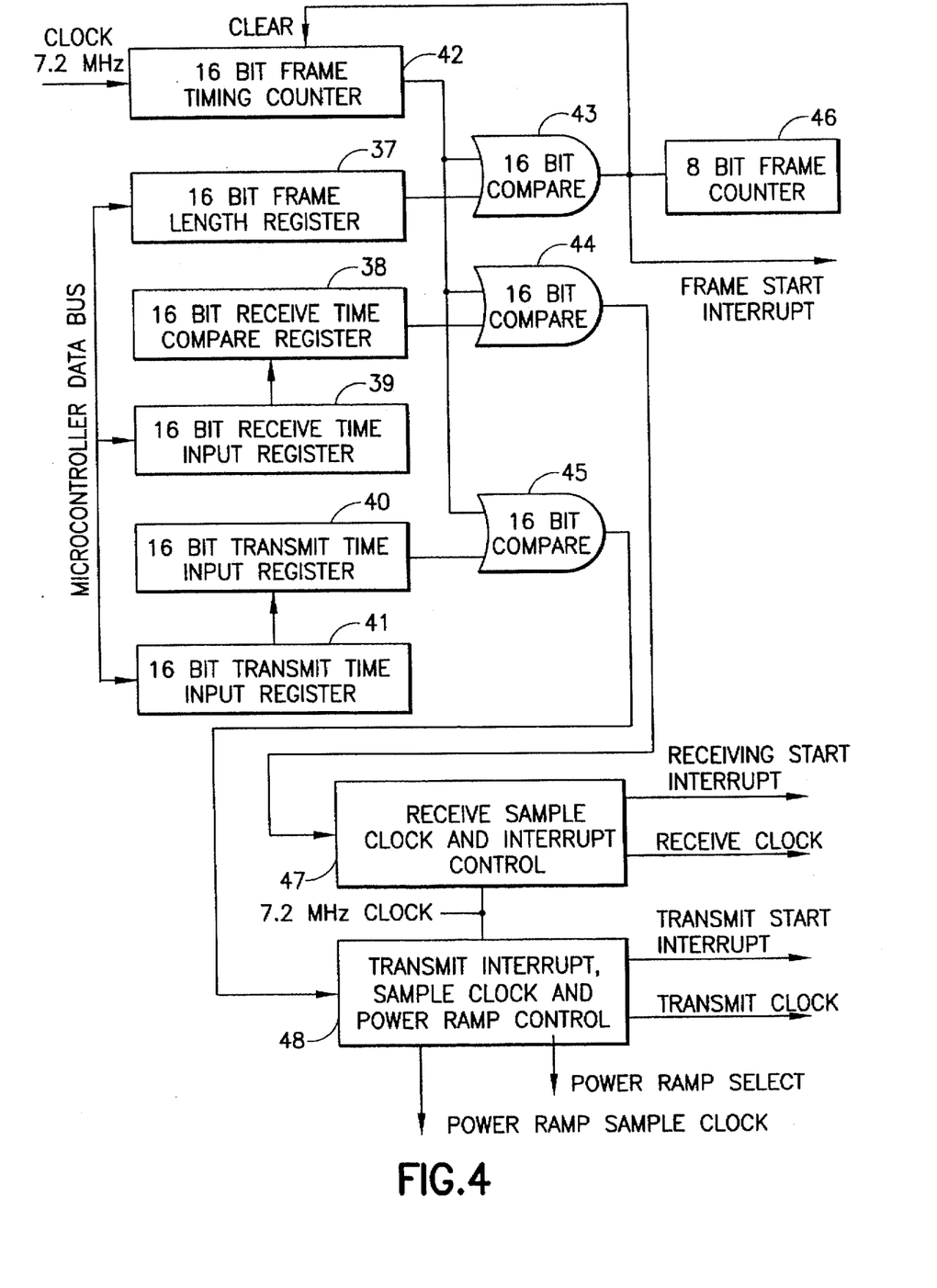
FIG. 4 presents the structure of the frame timing unit in FIG. 1 in which some critical components are illustrated in more detail.

FIG. 4 presents the structure of frame timing unit 1 with some critical components being illustrated in more detail. The components corresponding to frame timing block 18 are: input register 37 (number 21 in FIG. 3), counter 42 (22) and comparator 43 (24). The components corresponding to burst building block 19 of the receive branch are: input register 39 (number 25 in FIG. 3), compare register 38 (28) and comparator 44 (29). Similarly, the components corresponding to burst building block 20 of the transmit branch are: input register 41 (number 31 in FIG. 3), compare register 40 (34) and comparator 45 (35). The above-mentioned components 37–45 in FIG. 4 are 16 bit components.

The basic idea of the TDMA frame timing is a fast timing control unit 1 (FIG. 1) which is easy to provide with parameters and which can be connected to 16 bit microcontroller 2 using data bus "microcontroller data bus" The main component of unit 1 is the 16 bit frame timing counter 42, shown in FIG. 4, which operates on a 7.2 MHz frequency. Control unit 1 is accurately clocked only by one clock signal "CLOCK". The components in FIG. 4 can be used to provide frame timing which enables a fast handover from one TDMA cell type to another without breaking the speech or data communication. As is obvious to those skilled in the art, the circuit can be implemented by CMOS technology. Since it only comprises a few components which operate at high frequencies, the logic consumes a fairly small amount of power. Frame timing control unit 1 can be used as an interface circuit of the 16 bit microcontroller 2, via which it controls the transmit and receive branch frame timing and burst building. Control unit 1 can be advantageously implemented as an integrated circuit or as part of a larger circuit.

Figure 5:
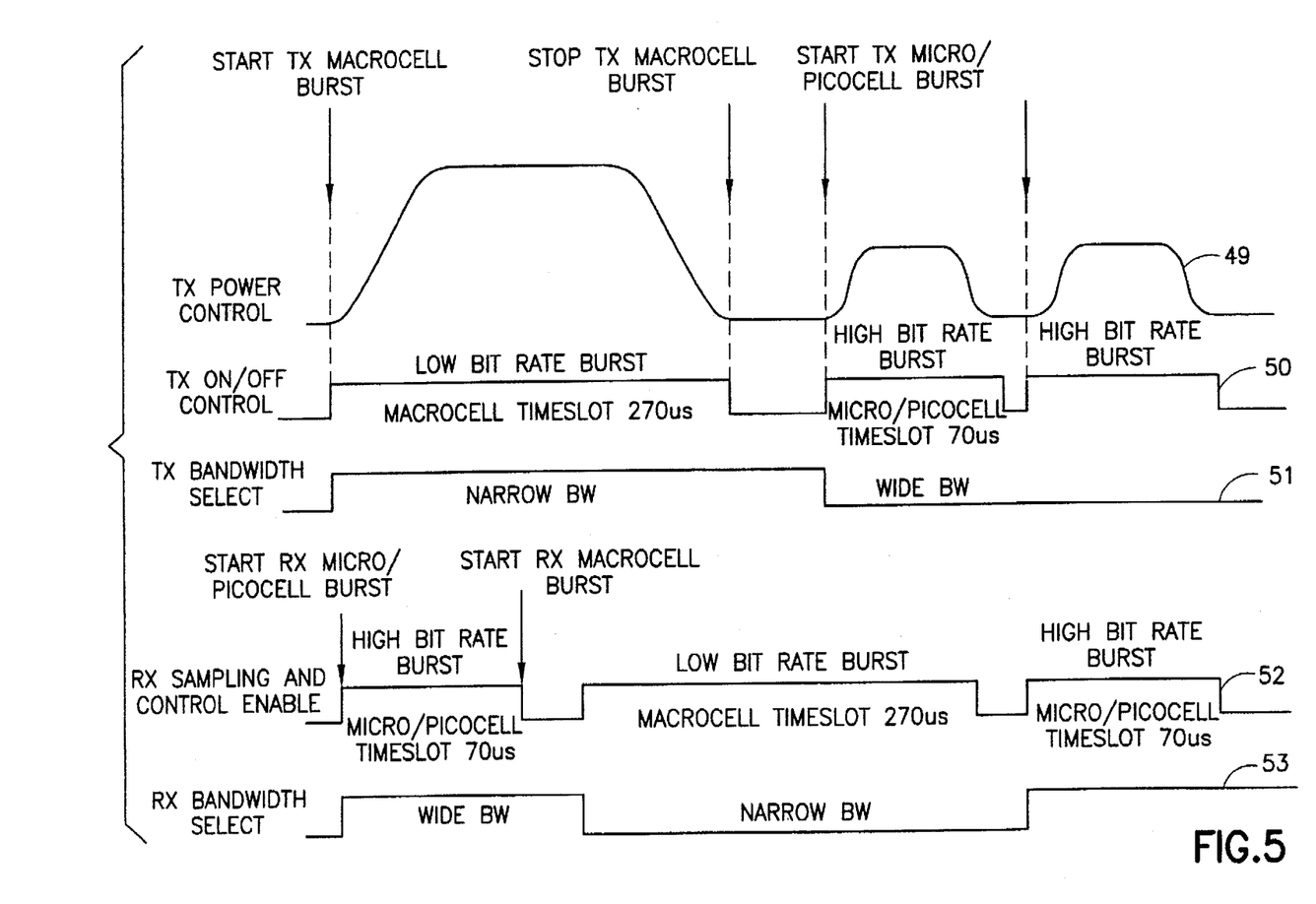
FIG. 5 presents an example of the operation of the frame timing control according to the invention, when moving from a low bit rate cell type (macrocell) to a high bit rate cell type (microcell/picocell).

FIG. 5 illustrates an example of the implementation of the frame timing and the timing of signals, in principle used for controlling the radio part (RF unit in FIG. 1) of a mobile station. In this example a transition is made from a low rate cell type (macrocell) to a high rate cell type (microcell/picocell). When the mobile station is transmitting data at high rate, the mobile station must, in order to enable control associated with communication responsibility handover, be able to simultaneously receive a short burst which has a high bit rate, i.e., high sampling rate, and to transmit a longer burst which has a lower bit rate, i.e., lower sampling rate. In a macrocell, the mobile station uses 17 time slots of a frame comprising 18 time slots in order to transfer 64 kbit/s of data. In this case the remaining time slot, i.e. burst, can be used to monitor the micro/picocell and to carry out the handover of communication responsibility.

The signals in FIG. 5 are:
transmit power control (Tx power control) 49, Tx ON/OFF control 50 and Tx bandwidth select 51; and
receive sampling and control enable (Rx sampling and control enable) 52 and Rx bandwidth select 53.

It is assumed in the example that when moving from a macrocell into a micro/picocell, they have the following properties:

|  | Macrocell | Micro/picocell |
| --- | --- | --- |
| Frame length, ms | 5 | 5 |
| Burst length, μs | 278 | 69 |
| Carrier wave bit rate, kbit/s | 450 | 1800 |
| Bit length, μs | 2.2 | 0.55 |

It is worth nothing that the length values of the time slots in FIG. 5 are rounded off (signals 50 and 52). FIG. 5 can also be advantageously compared with the principle presented in FIG. 2 and it can be read on the time axis in the direction of left to right. However, FIG. 5 only shows part of the frame at an arbitrary point, whereby only a few bursts of the frame are shown, in the order of 500 μs for the time period, while the entire frame length is the above-mentioned 5 ms. It should be noted now that the bit rate of the microcell in this example is quadruple compared with a macrocell, whereby the sampling rates of the D/A and A/D converters must also be quadruple in the microcell.

It is assumed in the beginning of FIG. 5 that a normal radio link has been established between the mobile station and the base station of the macrocell. The timing circuits in both units are set in the operation mode in which a fixed bit rate and burst length are used for the operation of the macrocell. It is then assumed that the mobile station has moved and is trying to hand the communication responsibility over to the microcell. This can now be done using the above-mentioned free burst while still maintaining the existing link with the base station of the macrocell. The control communication which is established with the microcell means, on the other hand, that fast, periodic parameter changes must be performed between bursts in the timing circuits of the mobile station. This is possible using the method and circuit arrangement of the invention, which are described above with reference to FIGS. 1–4.

When the mobile station listens to the microcell, the burst length and bit rate must be set according to the operation mode of the microcell. While the macrocell conveys traffic, the burst length and bit rate of the macrocell must be used during the corresponding time slots, i.e., bursts, according to the operation mode of the macrocell. In this way, the changing of burst parameters during several frames is unavoidably connected with the handover responsibility of the mobile station. Due to the sharing of the work load by timing unit 1 and microcontroller 2 according to the invention, these changes can be effected at the beginning of the respective burst so that the operation mode can be changed during the same frame from macrocell operation to microcell operation and vice versa, also several times.

FIG. 5 further presents, using signals 49–52 of the transmit branch, that on the left (Tx ON/OFF, 50) a macrocell burst (Low Bit Rate Burst) is sent first, and then two microcell bursts (High Bit Rate Burst). Correspondingly, the power of the transmitter is controlled using the ramp control described above in connection with FIG. 3 so that power curve 49 in FIG. 5 is obtained, which has slightly curved ramp ups and downs. The power level is also controlled according to the operation mode of the respective macro- or microcell. Correspondingly, in the receive part, beginning on the left in FIG. 5, it is first shown how the mobile station receives (Rx sampling and control enable, 52) a high bit rate burst, thereafter a low bit rate burst, and another high bit rate burst.

The flexible TDMA frame timing control logic according to the invention can be used to apply, a desired frame length and a desired burst length which can vary from burst to burst, as well as a desired burst transmit or receive value. The control logic, i.e. frame timing control unit 1 and microcontroller 2 according to the invention can be used to apply sequential time slots simultaneously both for transmission and reception. The TDMA frame timing control logic according to the invention provides signals required for accurate timing from a single 7.2 MHz clock signal. The frame timing control logic is connected as an interface circuit of a 16 bit microcontroller and implemented by programmable logic networks.

Even though embodiments considered advantageous have been examined fairly closely with the aid of the examples, it is obvious to those skilled in the art that the method according to the invention and the circuit arrangements based on it can be implemented using other circuit arrangements as long as they fall within the appended claims.

I claim:

1. A method for TDMA frame timing control in a transmitter and receiver part of a mobile station, wherein different burst lengths can be transmitted and received in a TDMA frame, comprising the steps of:

dividing frame timing control between a microcontroller and a frame timing control unit that comprises a frame timing block, a receive branch burst building block, and a transmit branch burst building block;

using the microcontroller to define a TDMA frame length, a burst start value, and a burst stop value; and using the frame timing block to set the TDMA frame length in accordance with the defined TDMA frame length, the frame timing block transmitting timing information to the microcontroller for indicating a start of each frame and a start of each burst within the frame, wherein timing data information is transmitted within the frame timing control unit to the burst building block of the receive branch and the burst building block of the transmit branch.

2. A method according to claim 1, wherein the frame timing block:

a) receives data indicating the frame length from the microcontroller and stores the data;

b) a counter of the frame timing block receives clock pulses (clk) which increment a count value held by the counter;

c) the stored frame length is compared with the counter value after each clock pulse, and when the counter value equals the stored frame length data, the result of the comparison produces an interrupt signal (frame int) to the microcontroller and a reset signal (clr) which resets the counter; and where steps a)–c) are repeated continuously.

3. A method according to claim 2, wherein during step b):

b1) the value of the counter is stored in an output register from where the microcontroller obtains accurate frame timing data when required.

4. A method according to claim 2, wherein the counter comprises a synchronization input (sync), whereby the synchronization input can be activated so that the counter is reset during a count cycle before the incrementing of the counter.

5. A method according to claim 1, wherein the microcontroller updates data which corresponds to the frame length stored in the frame timing block so that the frame length meets the requirements of a TDMA system of interest.

6. A method according to claim 1, wherein the microcontroller controls, according to the requirements of a TDMA system of interest, at least one of a sampling rate of momentary receive burst lengths, momentary transmit burst lengths, receive burst building, a sampling rate of transmit burst building, or a transmit power level.

7. A method according to claim 1, wherein the microcontroller and the frame timing control unit are connected to each other by a data bus which is used to transfer, from the microcontroller to the frame timing control unit, information specifying the defined TDMA frame length, the burst start value, and the burst stop value.

8. A method according to claim 7, wherein the microcontroller is comprised of a digital signal processor.

9. A method according to claim 1, wherein the frame timing control unit further comprises an input register, that receives and stores the frame length value defined by the microcontroller, and a counter having a first input coupled to a system clock signal which increments a value held by the counter, wherein the stored frame length value is transmitted to a first input of a comparator and the counter value is transmitted as a second input of the comparator, wherein the comparator produces, as an output signal, a frame start interrupt (frame int) as a frame synchronization signal to the microcontroller when the input signals are equal, and wherein the output signal also resets the counter such that the counter is enabled to define a next frame length.

10. A method according to claim 1, wherein the receiver branch burst building block is comprised of an input register, that receives and stores a microcontroller-defined receive burst start value and receive burst stop value, a comparator that compares the value stored in the input register to the timing data information for setting the duration of a receive burst and that generates a receive branch burst interrupt signal to the microcontroller, and a driver circuit that controls an operation of a receive branch A/D converter; and wherein the transmit branch burst building block is comprised of an input register, that receives and stores a microcontroller-defined transmit burst start value and transmit burst stop value, a comparator that compares the value stored in the input register to the timing data information for setting the duration of a transmit burst and that generates a transmit branch burst interrupt signal to the microcontroller, and a driver circuit that controls an operation of a transmit branch D/A converter.

11. A method according to claim 1, wherein the transmit branch burst building block controls a transmit power ramp and power ramp sampling.

12. A method according to claim 1, wherein at least some of the circuitry is implemented by CMOS technology as an integrated circuit.

13. A method for TDMA frame timing control in a mobile station, comprising the steps of:
partitioning TDMA frame timing control between a data processor and a frame timing control unit circuit that comprises a frame timing block, a receive branch burst control block, and a transmit branch burst control block, all of which are coupled to the data processor through a data path;
defining with the data processor a TDMA frame duration value, a transmit burst time start value within the frame, a transmit burst time end value, a receive burst time start value within the frame, and a receive burst time end value;
storing, over the data path, the TDMA frame duration value within the frame timing block;
generating, with the frame timing block, a frame timing interrupt to the data processor to indicate a start of a frame, and initiating a frame timer; in response to the frame timing interrupt, storing, over the data path, at least one of the transmit burst time start value within the transmit branch burst control block or the receive burst time start value within the receive branch burst control block;
comparing, in the burst control block, the stored burst time start value to the frame timer and, when the times are equal, generating a burst start interrupt to the data processor to indicate the start of the burst;
in response to the burst start interrupt, storing the corresponding one of the transmit burst time end value or receive burst time end value within the transmit branch burst control block or the receive branch burst control block; and
comparing, in the burst control block, the stored burst time end value to the frame timer and, when the times are equal, terminating the burst.

14. A method as set forth in claim 13, wherein a duration of a transmit burst differs from a duration of a receive burst.

15. A method as set forth in claim 14, and further comprising the steps of:
in the frame timing block, comparing the stored TDMA frame duration value to the frame timer; and
generating, when the times are equal, with the frame timing block, another frame timing interrupt to the data processor to indicate a start of a next frame, and reinitializing the frame timer.

16. A mobile station, comprising:
a data processor;
a frame timing control unit circuit that comprises a frame timing block that includes a frame timer, a receive branch burst control block, and a transmit branch burst control block, all of which are coupled to the data processor through a data path;
means in said data processor for defining a TDMA frame duration value, a transmit burst time start value within the frame, a transmit burst time end value, a receive burst time start value within the frame, and a receive burst time end value, and for storing, over said data path, the TDMA frame duration value within the frame timing block;
means in said frame timing block for generating a frame timing interrupt to said data processor to indicate a start of a frame, and for initiating said frame timer;
said data processor being responsive to the frame timing interrupt for storing, over said data path, at least one of the transmit burst time start value within said transmit branch burst control block or the receive burst time start value within said receive branch burst control block;
means in said burst control block for comparing the stored burst time start value to said frame timer and, when the times are equal, for generating a burst start interrupt to said data processor to indicate the start of the burst;
said data processor being responsive to the burst start interrupt for storing the corresponding one of the transmit burst time end value or receive burst time end value within said transmit branch burst control block or said receive branch burst control block; and
said comparing means in said burst control block comparing the stored burst time end value to said frame timer and, when the times are equal, for terminating the burst.

17. A mobile station as set forth in claim 16, wherein a duration of a transmit burst differs from a duration of a receive burst.

18. A mobile station as set forth in claim 16, and further comprising:

means in said frame timing block for comparing the stored TDMA frame duration value to said frame timer and, when the times are equal, for generating another frame timing interrupt to said data processor to indicate a start of a next frame, and for reinitializing said frame timer.

\* \* \* \* \*